Patented Aug. 15, 1950

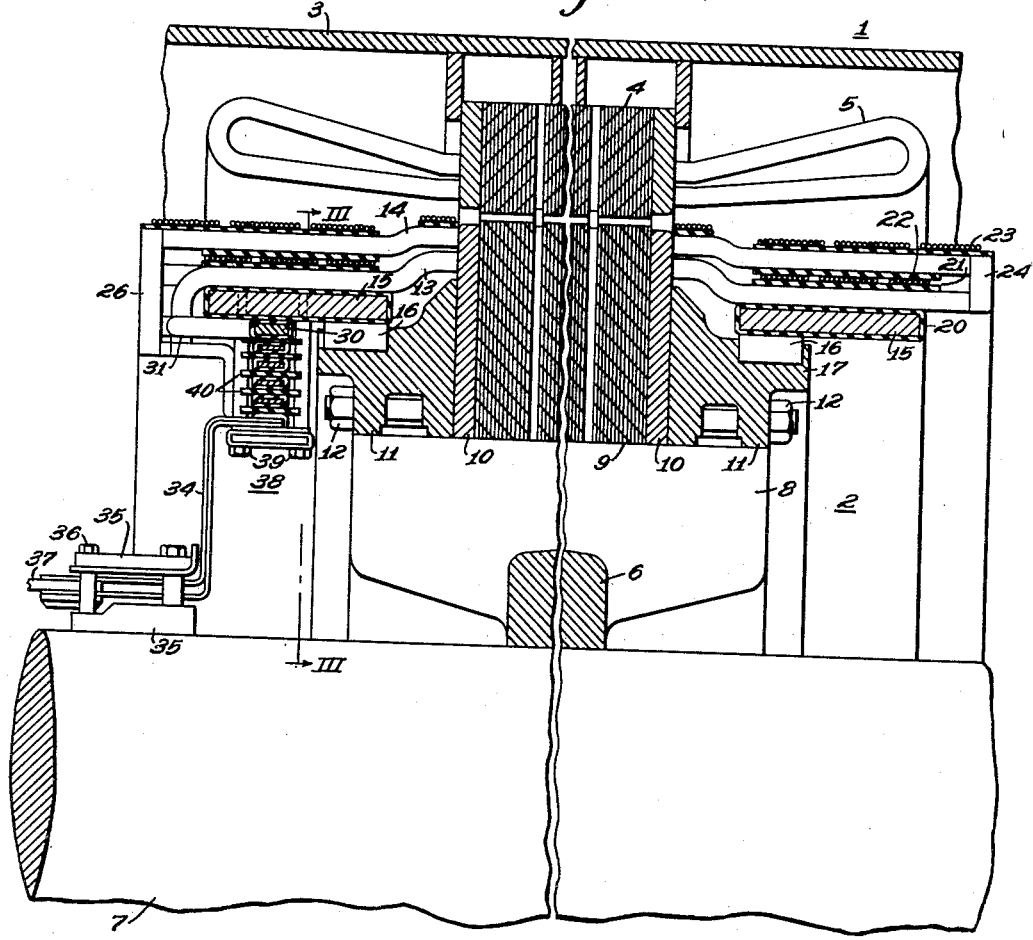

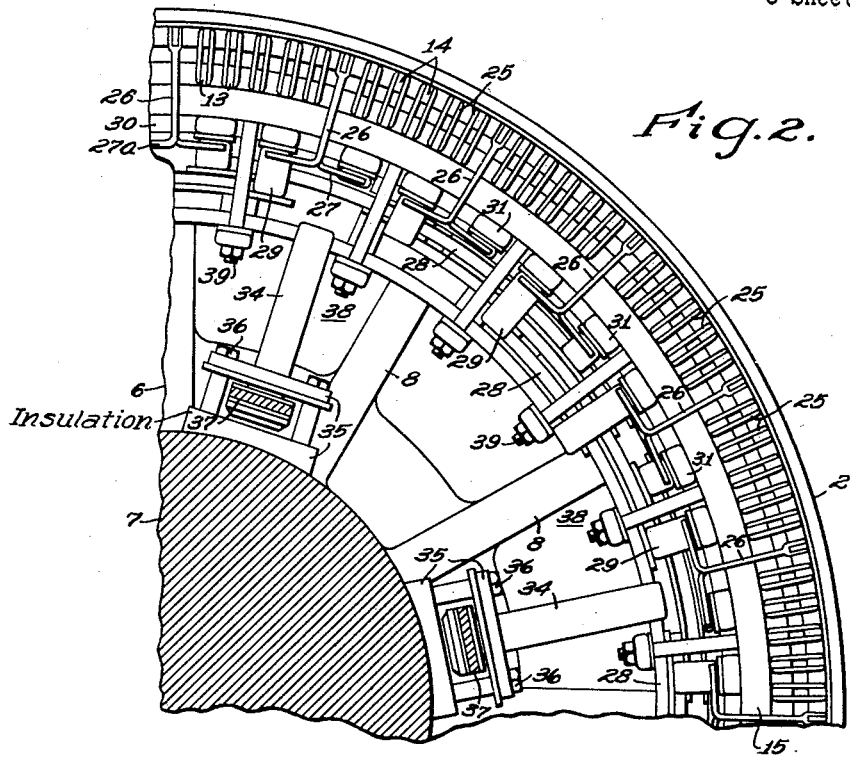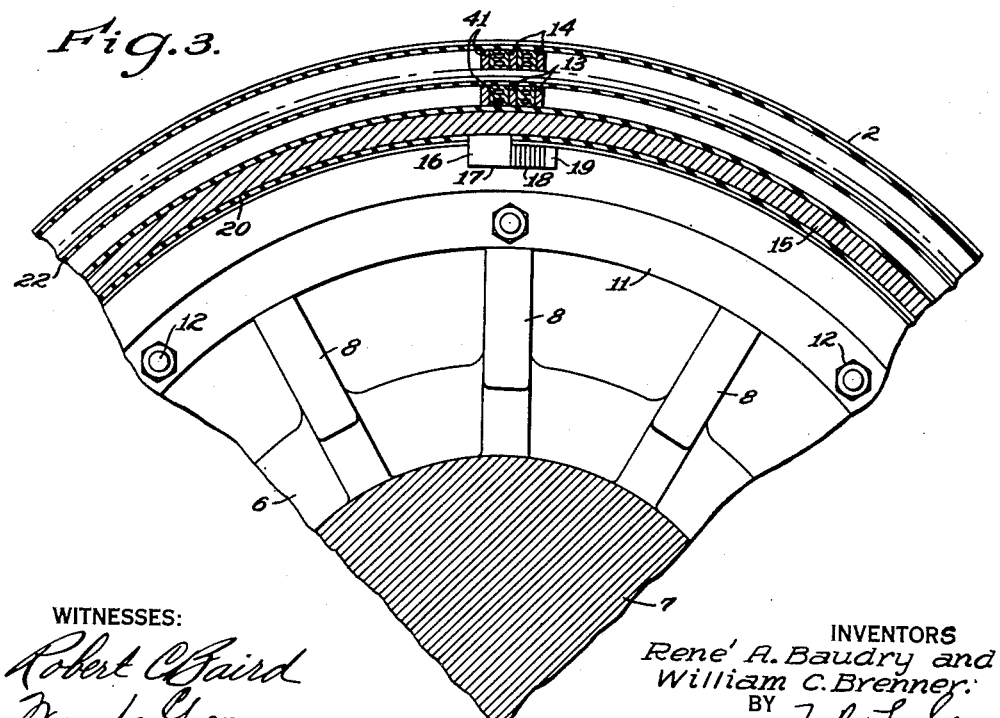

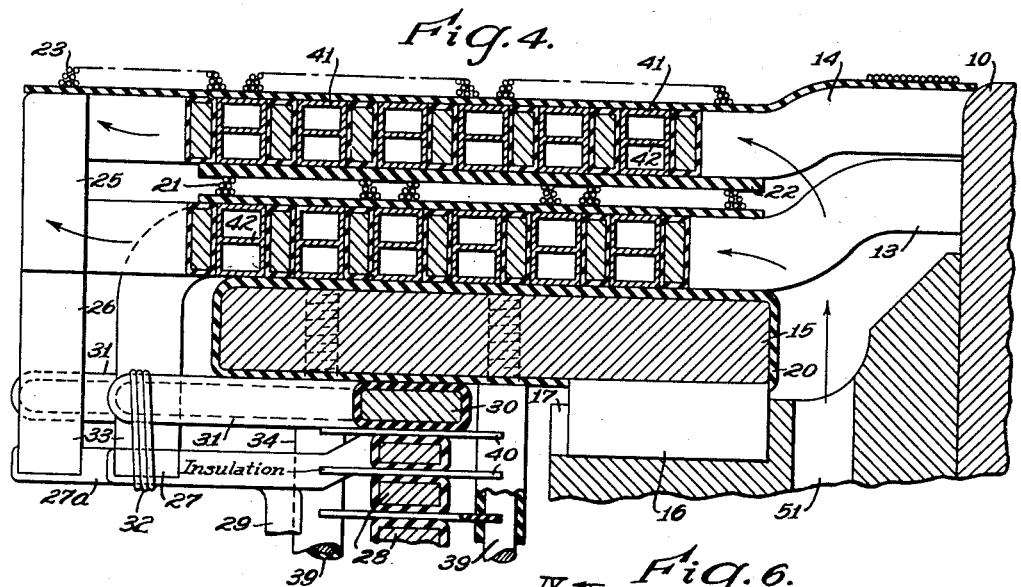
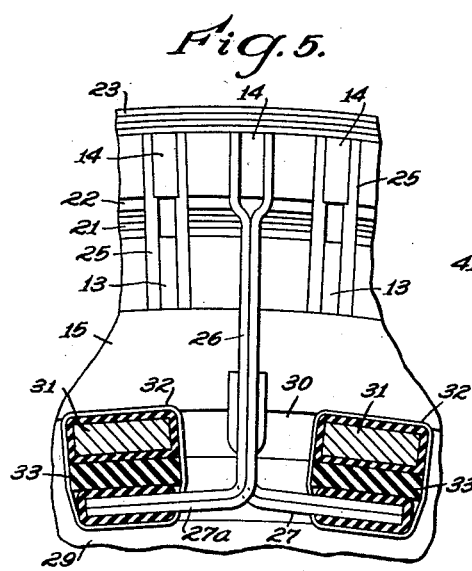
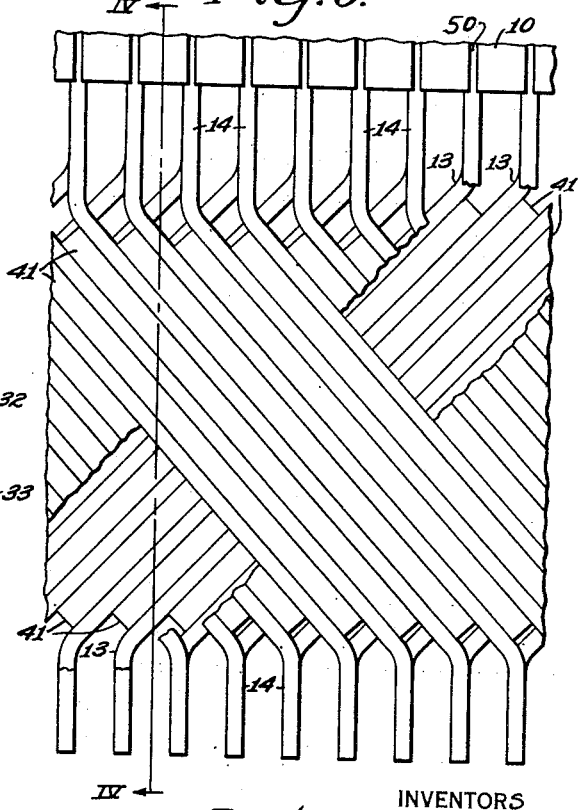

2,519,219

UNITED STATES PATENT OFFICE 2,519,219

ROTOR CONSTRUCTION FOR INDUCTION MOTORS

René A. Baudry and William C. Brenner, Pittsburgh, Pa., assignors to Westinghouse Electric Corporation, East Pittsburgh, Pa., a corporation of Pennsylvania Application August 21, 1947, Serial No. 769,810

15 Claims. (Cl. 172—120)

The present invention relates to large induction motors of the wound-rotor type, and more particularly to a rotor construction for motors of this type in which the rotor is intended to operate at high peripheral speeds.

The principal object of the invention is to provide a rotor construction for wound-rotor induction motors which are of such large physical size, or which operate at such high speed, that the peripheral speed of the rotor is very high. At high peripheral speeds, the centrifugal forces at the periphery of the rotor become very great, so that the end portions of the coils of the rotor winding, which extend beyond the rotor slots, and the end connections of the winding, must be very firmly supported to prevent displacement or distortion of the coil ends and coil connections by the centrifugal force.

A further object of the invention is to provide a rotor construction for wound-rotor induction motors in which the end portions of the coils of the rotor winding, and the end connections, are adequately supported to prevent displacement or distortion by high centrifugal forces, and in which limited axial and radial movement of the supporting means is permitted to allow for thermal expansion of the coil end portions, and for radial expansion of the supporting means under the influence of heat and centrifugal force.

Another object of the invention is to provide a rotor construction for wound-rotor induction motors in which the end portions of the rotor coils are securely held on a supporting member to prevent displacement of the coil ends by centrifugal force, and in which provision is made for adequately ventilating the coil end portions.

Still another object of the invention is to provide a rotor construction for wound-rotor induction motors in which the end portions of the rotor coils are securely held on a supporting member at the end of the rotor, and in which the end connections of the rotor winding are also supported on the supporting member to prevent displacement or distortion of the end connections by centrifugal force.

More specifically, the invention provides a rotor construction for wound-rotor induction motors which are intended to operate at high peripheral speeds of the rotor, in which the end portions of the rotor coils are secured by banding wire on an annular supporting member, which is mounted on the end of the rotor in such a way that it is restrained against circumferential movement with respect to the rotor but is free to move axially and to expand radially, so as to permit the supporting member to follow the axial movement of the coil end portions which results from thermal expansion, and to expand radially under the influence of heat and centrifugal force. The connectors which extend from the coil ends to effect the winding connections are also secured to supporting means carried on the annular supporting member, so as to support the connectors against displacement or distortion by centrifugal force. Since the banding wire which holds the coil end portions on the supporting member substantially completely covers the end portions and prevents free circulation of air between them, ducts are placed between adjacent coil end portions for circulation of air, so as to provide adequate ventilation and prevent overheating.

The invention will be more fully understood from the following detailed description of a preferred embodiment, taken in connection with the accompanying drawing, in which:

Figure 1 is a longitudinal sectional view of the upper half of a large induction motor embodying the invention.

Fig. 2 is a fragmentary end view of the rotor member.

Fig. 3 is a fragmentary transverse sectional view of the rotor member, approximately on the line III—III of Fig. 1.

Fig. 4 is a fragmentary longitudinal sectional view of one end of the rotor, on an enlarged scale, the section plane being approximately indicated by the line IV—IV of Fig. 6.

Fig. 5 is a fragmentary end view of a portion of the rotor winding end connections, and Fig. 6 is a plan view showing a portion of the rotor coil end portions.

The motor shown in Fig. 1 has a stator or primary member 1 and a rotor or secondary member 2. The primary member 1 may be of any desired or usual construction, and is shown as having a frame 3 in which is supported a laminated stator core 4 which carries primary windings 5 of any suitable type.

The rotor member 2 includes a rotor spider 6, which is mounted on the shaft 7, and which has a plurality of generally radial arms 8. A laminated rotor core 9 is supported on the arms 8 of the spider, and is held between finger plates 10 and end plates 11 which are retained in position by means of bolts 12. The core 9 and finger plates 10 have peripheral slots indicated at 50 in Fig. 6, for the reception of the coil sides of the rotor winding.

The rotor winding is shown as being of the half-coil type, that is, each coil consists of two coil sides of insulated copper strap conductors, which are placed separately in different slots of the core and connected at their ends by suitable connectors. In the particular embodiment shown, each slot of the rotor core 9 has a lower coil side 13 in the bottom of the slot and an upper coil side 14 in the top of the slot. The end portions of the coil sides 13 and 14 extend axially beyond the core and are bent angularly, as shown in Fig. 6, for connection to appropriate coil sides in other slots.

Since the rotor of the present invention is intended for operation at high peripheral speed, the centrifugal force to which the end portions of the coil sides 13 and 14 is subjected is very high, and it is necessary to adequately support the coil end portions against displacement or movement relative to the rotor resulting from this high centrifugal force. In accordance with the present invention, the coil end portions are supported on annular supporting members or rings 15 at each end of the rotor, the arrangement being the same at both ends. The rings 15 are mounted on the end plates 11, and each of the rings 15 has a plurality of generally radial keys 16 which engage in recesses 17 in the end plates 11. Four keys 16 are provided on each of the rings 15 in the illustrated embodiment of the invention, but any other suitable number of keys might be used. The recesses 17 in the end plates are considerably wider than the keys 16, and the rings 15 are held against rotation relative to the rotor by means of a plurality of leaf-springs 18, which are placed in the recesses 17 to bear against the keys 16. The springs 18 are retained in position by wedge members 19 which compress them so that each of the keys 16 is held against the wall of its recess 17 by spring pressure. The total spring pressure on the keys is preferably made greater than the weight of the ring 15 plus the weight of all the elements supported by the ring. Thus, the rings 15 are restrained against circumferential movement relative to the rotor, but are free to move axially and to expand radially.

Each of the rings 15 is covered with suitable insulation 20, and the lower layer of coil end portions 13 rests directly on the insulated ring 15 and is firmly secured to it by means of several layers of steel banding wire 21. A layer of insulation 22 is applied on top of the banding wire 21, and the upper layer of coil end portions 14 is firmly secured on the lower layer by means of several layers of steel banding wire 23. In this way, the coil end portions are securely held against displacement or distortion due to the high centrifugal force to which they are subjected. The floating mounting of the support rings 15, however, permits the rings to move axially to follow the longitudinal movement of the coil end portions which is caused by thermal expansion of the coils when the motor is carrying load, and the rings 15 are also free to expand radially under the influence of centrifugal force and of their own thermal expansion when heated.

The coils of the rotor winding, as stated above, are of the half-coil type, and the connections between coil sides of each complete coil are made by suitable connectors. The connections between coil sides at the rear end of the machine may be made in any suitable manner, as by generally radial copper strap connectors 24. Since these connectors are quite stiff and relatively short, they do not require any particular supporting means other than that already described.

The connections between coil sides at the front of the machine are more complicated, however, since they include the connections between the various coils and coil groups. As shown in Fig. 2, certain of the coil sides are connected together by means of relatively short copper strap connectors 25, which may be similar to the connectors 24. The different coil groups of the winding are connected together by means of generally radial copper strap connectors 26, which are brazed or otherwise secured to the ends of certain ones of the upper coil sides 14, as shown in Fig. 2, and which extend radially below the support ring 15. The corresponding lower coil sides 13 are bent down radially, as shown in Fig. 4, and are joined to connectors 27 which extend circumferentially and then axially. The connectors 26 also have portions 27a which extend circumferentially and axially. The connections between the various coil groups of the winding are made by arcuate copper connectors 28 which extend circumferentially within the ring 15. Certain of the arcuate connectors 28 are joined directly to the connectors 27, and connections between the connectors 28 and the connectors 27a are made by means of radial connectors 29. The precise arrangement of the connectors 28 and 29 will depend, of course, upon the number and distribution of coils and coil groups and the number of poles.

Since the connectors 26, 27 and 27a are relatively long and thin, they are subject to distortion or displacement by centrifugal force, and the present invention, therefore, includes means for supporting these connectors. For this purpose, a ring member 30 is provided which is carried on the ring 15, and which has a plurality of axially extending steel fingers 31 welded to it which extends axially beyond the ring 15. The fingers 31 are alternately long and short, as shown in Fig. 4, in accordance with the positions of the connectors 27 and 27a, and these connectors extend under the fingers 31 and are tied to them by means of glass twine 32, as shown in Fig. 5. The fingers 31 are preferably covered with insulation, and insulating blocks 33 are placed between the connectors 27 and 27a and the fingers 31 to properly locate the connectors.

The arcuate connectors 28 are retained in position by means of cleat assemblies 38 on the support ring 15. Each of the cleat assemblies 38 comprises two insulated bolts 39 threaded into the support ring 15 and spaced apart on opposite sides of the conductors 28. Insulating spacers 40 are placed between the connectors 28 and the entire assembly is rigidly held by the bolts 39, which also serve to retain the ring 30 in position. Thus, all of the end connections of the rotor winding are firmly held in place on the ring 15 by means of the cleat assemblies 38 and the ring 30 with its fingers 31.

The rotor winding is connected to the external circuit by means of radial connectors 34, which are connected to suitable one of the arcuate connectors 28, and which extend radially towards the shaft 7 and are clamped to the shaft by means of insulating blocks 35 and bolts 36 which are threaded into the shaft. The connectors 34 are joined to leads 37 which extend axially along the shaft and are connected to collector rings of any suitable type (not shown).

Since the banding wire 21 and 23 which secures the coil end portions on the support ring 15 substantially covers the coil end portions and prevents any radial flow of air through them, and since the heavy currents in the rotor winding generate considerable heat, it is necessary to provide some means to prevent overheating of the coil end portions. For this purpose, metal duct members 41, which may be made of aluminum or other suitable material, are placed between adjacent coil end portions. As shown in Fig. 4, these duct members 41 may be generally rectangular in cross-section, or they may be of any other suitable shape, and they may have a central dividing wall 42 to increase their strength and to increase the surface area exposed to the air flowing through them. The duct members 41 are placed between the end portions of the coil sides, as shown in Fig. 6, which is a plan view with the banding wire and end connections omitted, and with some of the upper layer of coil ends broken away. The duct members 41 are shaped longitudinally to conform to the coil ends, which are usually slightly curved, and duct members are placed between each adjacent pair of coil end portions in both the upper and lower layers. When the rotor is rotating, the fan effect of the coil end portions with the associated supporting structure causes air to be drawn through air holes 51 in the end plate 11, and to flow through the duct members 41, as shown by the arrows in Fig. 4, thus adequately and effectively cooling the coil end portions and preventing overheating.

It should now be apparent that a construction has been provided for wound rotors which are intended to operate at high peripheral speeds, in which the coil end portions and end connections are firmly and adequately supported against centrifugal force, and in which the coil ends are adequately ventilated. It will be apparent that various modifications of the invention are possible and it is to be understood, therefore, that it is not limited to the specific details of construction shown and described, but in its broadest aspects, it includes all equivalent embodiments and modifications which come within the scope of the appended claims.

We claim as our invention:

1. An induction motor having a stator member and a rotor member, said rotor member including a laminated core, a rotor winding comprising a plurality of coils disposed in slots in said rotor core, each of said coils having end portions extending generally axially beyond the core, an annular support member at the end of the rotor member, means for securing said coil end portions on said support member, means for mounting the support member on the rotor member, said mounting means comprising projecting keys on the support member engaging in recesses in the rotor member and means for restraining the support member against circumferential movement, the support member being free to expand radially and to move axially, means for circulating cooling air between the coil end portions, end connections for said coils, and means for supporting said end connections on the support member to prevent displacement of the end connections.

2. An induction motor having a stator member and a rotor member, said rotor member including a laminated core, a rotor winding comprising a plurality of coils disposed in slots in said rotor core, each of said coils having end portions extending generally axially beyond the core, an annular support member at the end of the rotor member, means for securing said coil end portions on said support member, the support member having a plurality of radial keys engaging in recesses in the rotor, whereby the support member is free to expand radially and to move axially, spring means in said recesses engaging said keys to prevent circumferential movement of the support member, means for circulating cooling air between the coil end portions, end connections for said coils, and means for supporting said end connections on the support member to prevent displacement of the end connections.

3. An induction motor having a stator member and a rotor member, said rotor member including a laminated core, a rotor winding comprising a plurality of coils disposed in slots in said rotor core, each of said coils having end portions extending generally axially beyond the core, an annular support member at the end of the rotor member, means for securing said coil end portions on said support member, the support member having a plurality of radial keys engaging in recesses in the rotor, whereby the support member is free to expand radially and to move axially, spring means in said recesses engaging said keys to prevent circumferential movement of the support member, duct means disposed between adjacent coil end portions for circulation of cooling air, end connections for said coils, and means for supporting said end connections on the support member to prevent displacement of the end connections.

4. An induction motor having a stator member and a rotor member, said rotor member including a laminated core, a rotor winding comprising a plurality of coils disposed in two layers in slots in the rotor core, each of said coils having end portions extending generally axially beyond the core, an annular support member at the end of the rotor member, means for securing the end portions of the lower layer of coils on said support member, means for separately securing the end portions of the upper layer of coils on the lower layer of coil end portions, the support member having a plurality of radial keys engaging in recesses in the rotor, whereby the support member is free to expand radially and to move axially, spring means in said recesses engaging said keys to prevent circumferential movement of the support member, means for circulating cooling air between the coil end portion, end connections for said coils, and means for supporting said end connections on the support member to prevent displacement of the end connections.

5. An induction motor having a stator member and a rotor member, said rotor member including a laminated core, a rotor winding comprising a plurality of coils disposed in slots in said rotor core, each of said coils having end portions extending generally axially beyond the core, an annular support member at the end of the rotor member, means for securing said coil end portions on said support member, the support member being mounted on the rotor member and being free to move radially and axially to permit radial expansion and axial displacement of the support member, means for restraining the support member against circumferential movement, means for circulating cooling air between the coil end portions, end connections extending generally radially from at least some of the coil end portions, a ring member mounted on said support member, said ring member having a plurality of axially extending fingers, and means for securing said end connections to said fingers.

6. An induction motor having a stator member and a rotor member, said rotor member including a laminated core, a rotor winding comprising a plurality of coils disposed in slots in said rotor core, each of said coils having end portions extending generally axially beyond the core, an annular support member at the end of the rotor member, means for securing said coil end portions on said support member, the support member having a plurality of radial keys engaging in recesses in the rotor, whereby the support member is free to expand radially and to move axially, spring means in said recesses engaging said keys to prevent circumferential movement of the support member, duct means disposed between adjacent coil end portions for circulation of cooling air, end connections extending generally radially from at least some of the coil end portions, a ring member mounted on said support member, said ring member having a plurality of axially extending fingers, and means for securing said end connections to said fingers.

7. An induction motor having a stator member and a rotor member, said rotor member including a laminated core, a rotor winding comprising a plurality of coils disposed in slots in said rotor core, each of said coils having end portions extending generally axially beyond the core, an annular support member at the end of the rotor member, means for securing said coil end portions on said support member, means for mounting the support member on the rotor member, said mounting means comprising projecting keys on the support member engaging in recesses in the rotor member and means for restraining the support member against circumferential movement, the support member being free to expand radially and to move axially.

8. An induction motor having a stator member and a rotor member, said rotor member including a laminated core, a rotor winding comprising a plurality of coils disposed in slots in said rotor core, each of said coils having end portions extending generally axially beyond the core, an annular support member at the end of the rotor member, means for securing said coil end portions on said support member, the support member having a plurality of radial keys engaging in recesses in the rotor, whereby the support member is free to expand radially and to move axially, and spring means in said recesses engaging said keys to prevent circumferential movement of the support member relative to the rotor member.

9. An induction motor having a stator member and a rotor member, said rotor member including a laminated core, a rotor winding comprising a plurality of coils disposed in two layers in slots in the rotor core, each of said coils having end portions extending generally axially beyond the core, an annular support member at the end of the rotor member, means for securing the end portions of the lower layer of coils on said support member, means for separately securing the end portions of the upper layer of coils on the lower layer of coil end portions, the support member having a plurality of radial keys engaging in recesses in the rotor, whereby the support member is free to expand radially and to move axially, and spring means in said recesses engaging said keys to prevent circumferential movement of the support member relative to the rotor member.

10. An induction motor having a stator member and a rotor member, said rotor member including a laminated core, a rotor winding comprising a plurality of coils disposed in slots in said rotor core, each of said coils having end portions extending generally axially beyond the core, means for securing said coil end portions on the rotor member, and metal duct members disposed between adjacent coil end portions for circulation of cooling air, said duct members extending longitudinally of the coil end portions.

11. An induction motor having a stator member and a rotor member, said rotor member including a laminated core, a rotor winding comprising a plurality of coils disposed in two layers in slots in the rotor core, each of said coils having end portions extending generally axially beyond the core, an annular support member at the end of the rotor member, means for securing the end portions of the lower layer of coils on said support member, means for separately securing the end portions of the upper layer of coils on the lower layer of coil end portions, and metal duct members disposed between adjacent coil end portions of both layers for circulation of cooling air, said duct members extending longitudinally of the coil end portions.

12. An induction motor having a stator member and a rotor member, said rotor member including a laminated core, a rotor winding comprising a plurality of coils disposed in two layers in slots in the rotor core, each of said coils having end portions extending generally axially beyond the core, an annular support member at the end of the rotor member, means for securing the end portions of the lower layer of coils on said support member, means for separately securing the end portions of the upper layer of coils on the lower layer of coil end portions, the support member having a plurality of radial keys engaging in recesses in the rotor, whereby the support member is free to expand radially and to move axially, spring means in said recesses engaging said keys to prevent circumferential movement of the support member relative to the rotor member, and duct means disposed between adjacent coil end portions of both layers for circulation of cooling air.

13. An induction motor having a stator member and a rotor member, said rotor member including a laminated core, a rotor winding comprising a plurality of coils disposed in slots in said rotor core, each of said coils having end portions extending generally axially beyond the core, an annular support member at the end of the rotor member, said support member being mounted on the rotor member and being free to move radially and axially to permit radial expansion and axial displacement of the support member, means for restraining the support member against circumferential movement, means for securing said coil end portions on said support member, end connections for said coils, said end connections including portions extending generally radially from at least some of the coil end portions, a ring member mounted on said support member, said ring member having a plurality of axially extending fingers, and means for securing said radial portions of the end connections to said fingers.

14. An induction motor having a stator member and a rotor member, said rotor member including a laminated core, a rotor winding comprising a plurality of coils disposed in two layers in slots in the rotor core, each of said coils having end portions extending generally axially beyond the core, an annular support member at the end of the rotor member, said support member being mounted on the rotor member and being free to move radially and axially to permit radial expansion and axial displacement of the support member, means for restraining the support member against circumferential movement, means for securing the end portions of the lower layer of coils on said support member, means for separately securing the end portions of the upper layer of coils on the lower layer of coil end portions, end connections for said coils, said end connections including portions extending generally radially from at least some of the coil end portions, a ring member mounted on said support member, said ring member having a plurality of axially extending fingers, and means for securing said radial portions of the end connections to said fingers.

15. An induction motor having a stator member and a rotor member, said rotor member including a laminated core, a rotor winding comprising a plurality of coils disposed in slots in said rotor core, each of said coils having end portions extending generally axially beyond the core, an annular support member at the end of the rotor member, means for securing said coil end portions on said support member, the support member having a plurality of radial keys engaging in recesses in the rotor, whereby the support member is free to expand radially and to move axially, spring means in said recesses engaging said keys to prevent circumferential movement of the support member relative to the rotor member, end connections for said coils, said end connections including arcuate portions disposed within the support member, means for securing said arcuate portions of the end connections to the support member, said end connections also including portions extending generally radially from at least some of the coil end portions, a ring member mounted on said support member, said ring member having a plurality of axially extending fingers, and means for securing said radial portions of the end connections to said fingers.

RENÉ A. BAUDRY.
WILLIAM C. BRENNER.

REFERENCES CITED

The following references are of record in the file of this patent:

UNITED STATES PATENTS

| Number | Name | Date |
|---|---|---|
| 630,930 | Reist | Aug. 15, 1899 |
| 1,150,043 | Lamme | Aug. 17, 1915 |

FOREIGN PATENTS

| Number | Country | Date |
|---|---|---|
| 401,009 | Great Britain | Nov. 9, 1933 |
| 91,227 | Switzerland | Oct. 17, 1921 |